(12) United States Patent
Kleinsasser et al.

(10) Patent No.: US 11,484,008 B2
(45) Date of Patent: Nov. 1, 2022

(54) PIG FEEDER WITH FEED FLOW ADJUSTMENT

(71) Applicant: Crystal Spring Colony Farms Ltd., Ste. Agathe (CA)

(72) Inventors: Jonathan Kleinsasser, Ste Agathe (CA); Tom McAdams, Ste Agathe (CA)

(*) Notice: Subject to any disclaimer, the term of this patent is extended or adjusted under 35 U.S.C. 154(b) by 746 days.

(21) Appl. No.: 16/425,060

(22) Filed: May 29, 2019

(65) Prior Publication Data

US 2019/0364846 A1 Dec. 5, 2019

Related U.S. Application Data

(60) Provisional application No. 62/680,898, filed on Jun. 5, 2018.

(51) Int. Cl.
*A01K 5/02* (2006.01)
*F16H 25/20* (2006.01)
*G05G 1/08* (2006.01)

(52) U.S. Cl.
CPC ............ *A01K 5/0225* (2013.01); *F16H 25/20* (2013.01); *G05G 1/085* (2013.01); *F16H 2025/2093* (2013.01)

(58) Field of Classification Search
CPC ........ A01K 5/0225; A01K 5/01; G05G 1/085; F16H 2025/2093
See application file for complete search history.

(56) References Cited

U.S. PATENT DOCUMENTS

| | | | |
|---|---|---|---|
| 4,660,508 A | 4/1987 | Kleinsasser et al. | |
| 5,570,656 A | 11/1996 | Waldner et al. | |
| 5,640,926 A * | 6/1997 | Kleinsasser | A01K 5/0225 119/53 |
| 6,199,511 B1 * | 3/2001 | Thibault | A01K 5/0241 119/53.5 |
| 9,313,999 B2 | 4/2016 | Jansen et al. | |
| 9,603,339 B2 | 3/2017 | Di Nello | |
| 2014/0130746 A1* | 5/2014 | Kleinsasser | A01K 5/00 119/51.5 |
| 2015/0083048 A1* | 3/2015 | McAdams | A01K 5/0225 119/51.5 |
| 2018/0020638 A1* | 1/2018 | Blevins | A01K 5/0266 119/51.11 |

FOREIGN PATENT DOCUMENTS

CN 107931472 A * 4/2018 ............. B21D 43/10

* cited by examiner

*Primary Examiner* — Joshua D Huson
*Assistant Examiner* — Katherine Anne Kloecker
(74) *Attorney, Agent, or Firm* — Adrian D. Battison; Ade & Company Inc.; Ryan W. Dupuis

(57) ABSTRACT

A feeder for pigs includes a hopper and a trough for receiving the feed where an elongate opening is defined by an elongate shelf to control the amount of feed discharged from the hopper to the trough. An adjustment linkage for lifting the shelf against the weight of feed in the hopper includes a first lift screw and a second lift screw each for applying a lifting force to the elongate adjustment member located at spaced positions from the end walls of the hopper. Each of the screws includes a gear box with a shaft connected between the two gear boxes to communicate drive therebetween for simultaneous operation of the lift screws by a hand crank connected to one at the top of the feed in the hopper.

1 Claim, 5 Drawing Sheets

PIG FEEDER WITH FEED FLOW ADJUSTMENT

This application claims the benefit under 35 USC 119 (e) of provisional application 62/680,898 filed Jun. 5, 2018.

This invention relates to a feeder for pigs which includes a hopper and a receptacle for receiving the feed from the hopper where an elongate opening is defined by an elongate adjustment component to control the amount of feed discharged from the hopper to the receptacle and to an adjustment mechanism which provides effective control over the position of the adjustment component.

BACKGROUND OF THE INVENTION

In U.S. Pat. No. 4,660,508 (Kleinsasser) issued Apr. 28, 1987 is disclosed a feeder which provides a shelf above the trough with the hopper discharging onto the shelf in a manner so that the feed remains on the shelf but can be moved from the shelf to the trough by the pig as required. Feeders of this type have achieved significant commercial success. Adjustment of the height of the shelf is necessary for the purpose of accommodating different types of feed and different feed rates and this is obtained by a hand crank screw which operates with a threaded nut to raise and lower a strap carrying the shelf. The screw is used in adjustment of this device because the deposit of the feed onto the self requires an accurate adjustment of the distance between the shelf and the bottom edge of the hopper so that cruder systems with a less fine adjustment have been rejected.

In U.S. Pat. No. 5,603,285 issued Feb. 18, 1997 and U.S. Pat. No. 5,967,083 issued Oct. 19, 1999 both by Kleinsasser of the present assignees there is shown a similar arrangement which includes a hopper above a shelf onto which feed can fall to be taken by the pig or dropped into a trough below the shelf. The height of the shelf is adjustable to change the width of the opening through which the feed passes to control feed rate. The shelf is carried on straps which extend along the end walls of the hopper and are movable by an adjustment linkage which allows the shelf to be adjusted in height for use with both weanling pigs and finisher pigs up to market weight.

The disclosures of the above patents are incorporated herein by reference or may be reviewed for further details not set out herein. However the invention herein can be used with other types of feeder not including a shelf.

In a feeder of the shelf type used as a wet/dry feeder, adjustment of the height of the shelf has been problematic with many attempts to provide a suitable adjustment system.

SUMMARY OF THE INVENTION

According to a first aspect of the invention there is provided a feeder for pigs comprising:

a hopper for containing a feed material to be dispensed to the pigs for feeding therefrom;

a receptacle for receiving the feed from the hopper from which the pigs can take the feed;

an elongate opening through which the feed passes so that the amount of feed discharged from the hopper to the receptacle is controlled by a width of the opening;

an elongate adjustment component extending along a length of the opening, the elongate adjustment component being located in contact with feed in the hopper so that the feed applies a load to the adjustment component during adjustment;

and an adjustment linkage for operating adjustment movement of the elongate adjustment component, the linkage including a first lift member and a second lift member each for applying a lifting force to the elongate adjustment member;

wherein each of the first and second lift member is spaced inwardly from a respective end of the elongate adjustment component so that there is a portion of the adjustment component which is cantilevered beyond the respective lift member.

The location of the two lift members at spaced positions inwardly of the end wall of the hopper and of the ends of the adjustment component allows the forces to be applied by only two such lift members while avoiding excessive forces on the adjustment component which could cause bending by the loads from the feed.

According to a second aspect of the invention there is provided a feeder for pigs comprising:

a hopper for containing a feed material to be dispensed to the pigs for feeding therefrom;

a receptacle for receiving the feed from the hopper from which the pigs can take the feed;

an elongate opening through which the feed passes so that the amount of feed discharged from the hopper to the receptacle is controlled by a width of the opening;

an elongate adjustment component extending along a length of the opening, the elongate adjustment component being located in contact with feed in the hopper so that the feed applies a load to the adjustment component during adjustment;

and an adjustment linkage for operating adjustment movement of the elongate adjustment component, the linkage including a first lift member and a second lift member each for applying a lifting force to the elongate adjustment member;

wherein each of the lift members includes a gear box with a shaft connected between the two gear boxes to communicate drive therebetween for simultaneous operation of the lift members.

The term lift member used herein allows also movement in the downward direction to change the adjustment in the opposite direction.

Preferably there is provided a first and a second support beam each extending across the hopper at a position spaced from ends of the hopper to which a respective one of the lift members is attached and onto which forces from the lift member is applied.

Preferably the hopper includes first and second side walls and the beams bridge across the side walls.

Preferably each of the lift members includes a screw by which a rotary motion applies a lifting force to the lift member. He screw thus provides a large mechanical advantage so that the manual force necessary to lift the adjustment component is much reduced and can be carried out by a simple hand crank. However other actuators can be provided and may not use a screw to provide the desired mechanical advantage.

Preferably the lift members are located within the hopper with a hand operated actuator located at a top of the feed in the hopper. This locates all of the components involved in the adjustment within the area of the hopper to avoid external components which could be accessible by the pigs or would increase the shipping dimensions of the feeder. However a crank located at another position can also be used.

Preferably each of the lift members includes a gear box with a shaft connected between the two gear boxes to communicate drive therebetween for simultaneous operation of the lift members. This allows the worker to simply and simultaneously adjust both lift linkages by an actuator attached to one gear box. Preferably this is provided by the above hand crank which can be attached to one of the gear boxes and project upwardly above the feed to allow simple low force actuation.

Preferably the shaft extends parallel to the elongate adjustment component.

Preferably each of the gear boxes includes bevel gears in a housing arranged such that a gear rotates a vertically extending screw member around a vertical axis to apply the lifting force upward on the elongate adjustment component or shelf.

In order to allow the worker to observe the adjustment amount which is being applied by the hand actuator, preferably the hopper includes an end wall and the adjustment linkage includes a strap extending along the end wall, the strap including a marked gauge member which indicates the adjusted position of the elongate adjustment component or shelf. As the feed typically is at a reduced height at the ends of an elongate hopper, the marked gauge is readily visible when located on the end wall even when the gear boxes and the and eh adjustment links are buried in the feed.

This arrangement is particularly effective when used in a feeder of the above type where there is provided a trough into which the feed can fall and where the elongate adjustment component comprises a shelf mounted above the trough and each of the first and second lift members is connected to the shelf for adjustment of the height thereof relative to a bottom edge of the hopper defining the opening therebetween. In this type of feeder, the feed applies a significant load to the shelf so that adjustment when the hopper is full is problematic. The above features provide an adjustment system which allows a simple two link arrangement to provide the required forces on the shelf while reducing the requirement for heavy reinforcement of the shelf to avoid bending under the loads applied.

In this type of feeder there is typically provided a water supply underneath the shelf operable by the pigs in what is known as a wet/dry feeder.

This adjustment method is particularly effective in an arrangement where the shelf height is only adjusted for controlling the dispensing rate and not to accommodate animals of different sizes as they grow. Such an arrangement is disclosed in PCT publication 2018/223222 published 13 Dec. 2018, the disclosure of which is incorporated herein by reference and which discloses a method for feeding pigs as they grow continually from weanling size to finisher pig size comprising:

providing a feeder unit which is accessed by the pigs both at weanling and finisher size;

the feeder unit having an elongate trough having a base and a sidewall for receiving and containing feed and arranged such that the head of the pig can reach over a top edge of the sidewall to the base for eating the feed;

the feeder unit having an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;

the feeder unit having a hopper for directly and continuously depositing feed onto said shelf;

said hopper including an elongate lowermost edge, the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly toward the base of the trough, the nipples being operable by the pigs to dispense water downwardly into the trough for mixing with feed in the trough;

the shelf being substantially fixed in height at a common height without adjustment for growth for use by the pigs both as weanling size and as they grow to finisher size;

arranging and fixing the shelf at a substantially fixed height relative to the upper front edge of the side wall such that the weanlings reach the feed on the shelf;

and arranging and fixing the shelf at the same substantially fixed height relative to the upper front edge of the side wall and the nipples such that the finisher pigs reach over the top edge of the side wall under the front edge of the shelf and operate the nipples.

It will be appreciated that the above invention can be expressed either as a method as defined above or as a feeder unit having the same features and characteristics.

Typically the shelf is adjustable in height over a distance sufficient only to adjust the space between the bottom edge of the hopper and the horizontal surface of the shelf to control supply of material onto the shelf. That is there is no adjustment for the size of the pig but only for the characteristic of the feed and its flow onto the shelf. Thus the shelf is typically adjustable in height by a distance less than 1.0 inch and not the much larger value necessary to allow the weanlings to feed.

In order to achieve this situation where the finishers can reach under the shelf to the water, the shelf has an edge portion at the front edge extending downwardly from the horizontal surface to a distance which is preferably less than 2.0 inches and more preferable less than 1.5 inches.

In order to achieve this situation where the finishers can reach under the shelf to the water, the shelf preferably has an edge portion defined by a curl or hem on the shelf edge and is reinforced by a member on the shelf underneath.

In order to achieve this situation where the finishers can reach under the shelf to the water, the shelf preferably has a distance from the horizontal surface to the base of less than 8.0 inches and preferable less than 7.0 inches.

In order to achieve this situation where the finishers can reach under the shelf to the water, the shelf has preferably an edge portion defined by a curl or hem on the shelf edge wherein no part of the curled or hemmed edge portion extends downwardly to a distance greater than 1.5 inches and preferably 1.0 inches from the horizontal surface.

In order to achieve this situation where the finishers can reach under the shelf to the water, the shelf is preferably reinforced by a member extending longitudinally of the shelf at a positon spaced rearwardly from the front edge such that the head of the finisher pig can pass underneath the front edge and underneath the member to the nipple adjacent the base.

In order to achieve this situation where the finishers can reach under the shelf to the water, a bottom end of each nipple is preferably located a distance from a flat horizontal portion of the base of less than 2.0 inches and preferably less than 1.5 inches and preferably of the order of 1.0 inch.

In order to achieve this situation where the finishers can reach under the shelf to the water, the front edge of the shelf has preferably a closest distance from a top edge of the side wall which is less than 7.0 inches.

Preferably the trough and the shelf are both a double sided such that the pigs can access both from each side with the shelf located midway across the trough.

In order to achieve this situation where the finishers can reach under the shelf to the water, the shelf is preferably reinforced by a member extending longitudinally of the shelf at a positon spaced rearwardly from the front edge such that the head of the finisher pig can pass underneath the front edge and underneath the member to the nipple adjacent the base and wherein the member is along a center line of the shelf.

In order to achieve this situation where the finishers can reach under the shelf to the water, the side wall of the trough is preferably no greater than 5 inches in height.

The weanlings are defined as pigs which weigh less than 30 and typically around 20 pounds and finisher pigs greater than 200 pounds and up to 300 pounds.

In accordance with another important feature of the invention, the shelf is formed of sheet material which has a side edge portion of the sheet material forming the shelf defined by a curled portion of the sheet material which is curved upwardly and inwardly such that the edge of the material sits on an upper surface of the material, the curled portion being located on top of the upper surface such that a bottom surface of the shelf at the edge is substantially flat with no depending portion. The curled portion is typically generally cylindrical so as to be curled around an axis raised from the upper surface of the shelf sheet metal so that the whole of the curl is above the upper surface. The edge is tightly located at the upper surface so as to seal as far as possible the curled portion to make a closed annular lip.

Preferably the shelf is reinforced by a flange extending longitudinally of the shelf at a positon spaced rearwardly from the side edge and typically lying along a center line of the shelf. The flange preferably extends upwardly but can be depending.

The adjustment system herein can be used with a feeder unit described in the above provisional application for feeding pigs as they grow continually from weanling size to finisher pig size comprising:

an elongate trough having a base and a sidewall for receiving and containing feed and arranged such that the head of the pig can reach over a top edge of the sidewall to the base for eating the feed;

an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;

a hopper for directly and continuously depositing feed onto said shelf;

said hopper including an elongate lowermost edge, the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly toward the base of the trough, the nipples being operable by the pigs to dispense water downwardly into the trough for mixing with feed in the trough;

wherein the shelf is formed of sheet material which has a side edge portion of the sheet material forming the shelf defined by a curled portion of the sheet material which is curved upwardly and inwardly such that the edge of the material sits on an upper surface of the material, the curled portion being located on top of the upper surface such that a bottom surface of the shelf at the edge is substantially flat with no depending portion.

Typically the shelf is double sided with two symmetrical side edge portions.

Preferably the shelf is reinforced by a member extending longitudinally of the shelf at a positon spaced rearwardly from the side edge.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
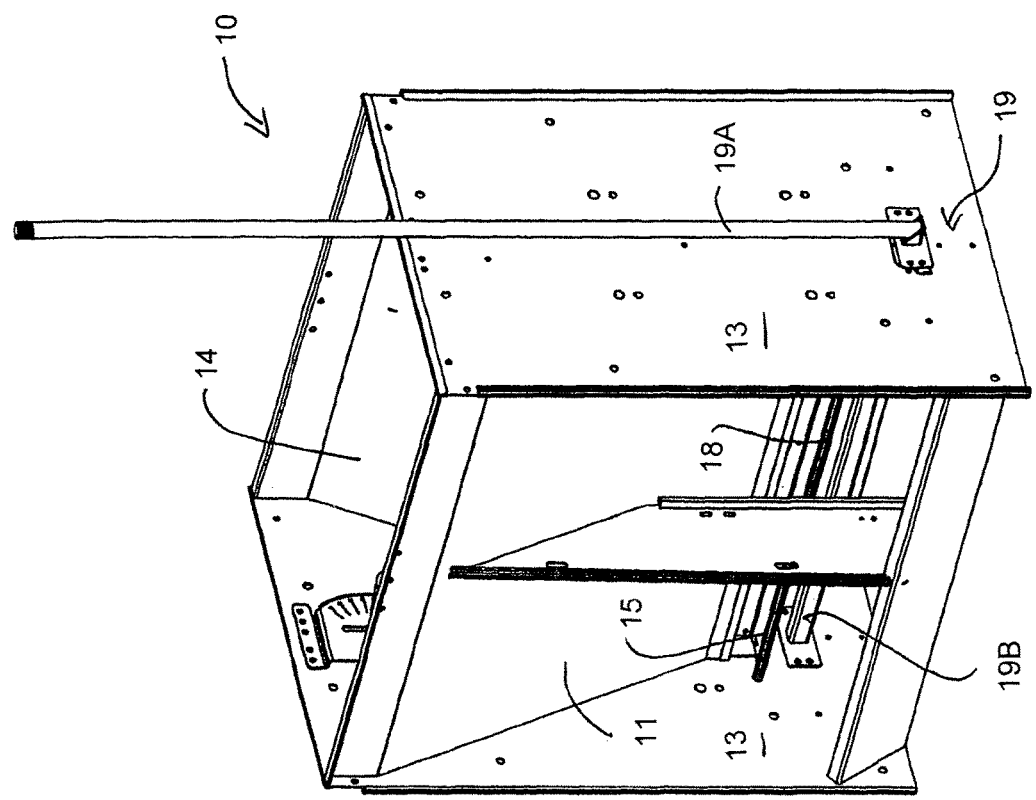
FIG. 1 is an isometric view of a feeder according to the present invention.

The feeder shown herein is similar in construction to that shown in the above patents of the present inventor, to which reference may be made for further detail.

A feeder is generally indicated at 10 and includes a hopper 11 and a trough 12. The trough is connected to the hopper by end walls 13 so as to form an integral structure with generally open top 14 through which feed can be inserted for containing in the hopper and for discharge into the trough 12 for feeding by one or more pigs. In the embodiment shown there is provided a shelf 15 with a generally horizontal surface 16 and an upturned curled edge 17.

A water supply 19 into the trough can be provided which includes an upstanding feeder pipe 19A, a pipe 19B along the trough and a plurality of downwardly extending nipples 19C with a pin or lever 19D under operation by the pig as is known in the above patents. A bottom end of the pin or actuator is shown at 19E.

The shape and arrangement of the hopper and trough can be varied and can provide either a two-sided structure as shown or a single sided structure.

The height of the shelf relative to the end wall of the hopper is adjusted by raising straps 20 where each strap is arranged at a respective end of the shelf and lies along the end wall 13 parallel to the end wall. The strap is raised and lowered by a lever 21 which can be connected to a support 23.

The elongate trough 12 has a flat horizontal base 12A and a sidewall 12B for receiving and containing feed and arranged such that the head of the pig can reach over a top edge 12C of the sidewall to the base 12A for eating the feed.

The elongate shelf 15 extends substantially along a full length of the trough and provides a substantially horizontal surface 16 for receiving feed. The horizontal surface of the shelf is arranged rearwardly of the top edge 12C and separate from the trough such that any feed falling therefrom along the full length thereof can fall directly vertically downwardly into the trough and so as to allow access by the head of the pig to the shelf for direct feeding therefrom, and between the shelf and the top edge to the base. The hopper 11 has an elongate lowermost edge 11A mounted and arranged such that the lowermost edge extends substantially wholly along, adjacent to and spaced from said horizontal surface by a vertical distance and spaced from a front edge 17 of the shelf by a horizontal distance such that the angle of repose of the feed from the lowermost edge to said shelf prevents the feed from falling over the front edge of the shelf and thus automatically controls deposit of further feed onto the shelf.

The water pipe 19B is located underneath the shelf along the shelf with a plurality of water dispensing nipples 19C mounted on the pipe at spaced positions along the pipe and extending from the pipe downwardly toward the base of the trough, the nipples being operable by the pigs to dispense water downwardly into the trough for mixing with any feed in the trough.

The shelf is substantially fixed in height at a common height for use by the pigs both as weanlings and as they grow to finisher pigs. The shelf is adjustable as described hereinafter only in relation to the edge 11A to control feed flow depending on the flow characteristics of the feed and not to compensate for or to accommodate for changes in size of the animal caused by growth.

The shelf 15 is fixed at the substantially fixed height relative to the upper front edge 12C of the side wall such that the weanlings can reach the feed on the shelf.

The shelf 15 is fixed at the same substantially fixed height relative to the upper front edge of the side wall and the nipples such that the finisher pigs reach over the top edge 12C of the side wall under the front edge 17 at the bottom 18A of the lip 18 of the shelf and operate the nipples.

The shelf 15 is adjustable in height over a distance sufficient only to adjust the space between the bottom edge of the hopper and the horizontal surface of the shelf to control supply of material onto the shelf and not to accommodate for growth. That is the shelf is adjustable in height by a distance less than 1.0 inch.

The shelf has an edge portion 18 at the front edge 17 defined by a hem or curled edge stiffening member which extends upwardly. However if a depending edge flange is used this can extend downwardly from the horizontal surface 16 to bottom edge 18A a distance which less than 2.0 inches and preferable less than 1.5 inches.

The shelf has an edge portion defined by a curl on the sheet metal forming the shelf edge and is reinforced by a flange 18C on the shelf at the center of the shelf which can be underneath extending downwardly or can extend upwardly.

Figure 3:
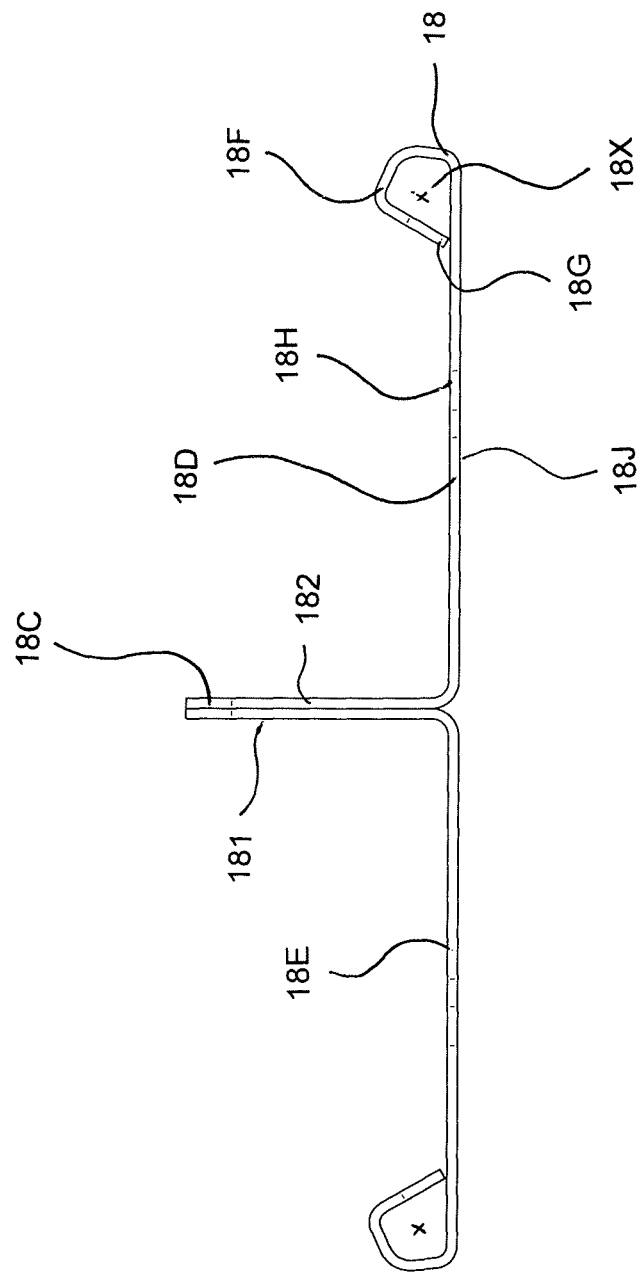
FIG. 3 is a cross sectional view on an enlarged scale of the embodiment of FIG. 1 showing the arrangement of the shelf.

Thus the shelf, as shown in FIG. 3, is formed of two portions of sheet material 18D, 18E each of which has a side edge portion 18 of the sheet material forming the shelf defined by a curled portion 18F of the sheet material which is curved upwardly and inwardly such that the edge 18G of the material sits on an upper surface 18H of the material. The curled portion is located wholly on top of the upper surface 18H such that a bottom surface 18J of the shelf at the edge is substantially flat with no depending portion. The curled portion 18F is generally cylindrical so as to be curled around an axis 18X raised from the upper surface 18H of the shelf sheet metal so that the whole of the curl is above the upper surface. The edge 18G is tightly located at the upper surface 18H so as to seal as far as possible the curled portion to make a closed annular lip.

Preferably the shelf is reinforced by a flange 18C extending longitudinally of the shelf at a positon spaced rearwardly from the side edge and typically lying along a center line of the shelf. The flange preferably extends upwardly but can be depending. The flange 18C is formed by bringing together two flange portions 181, 182 of the components 18E and 18D and fastening then together to define a common structure strongly stiffened by the double flange arrangement.

Figure 2:
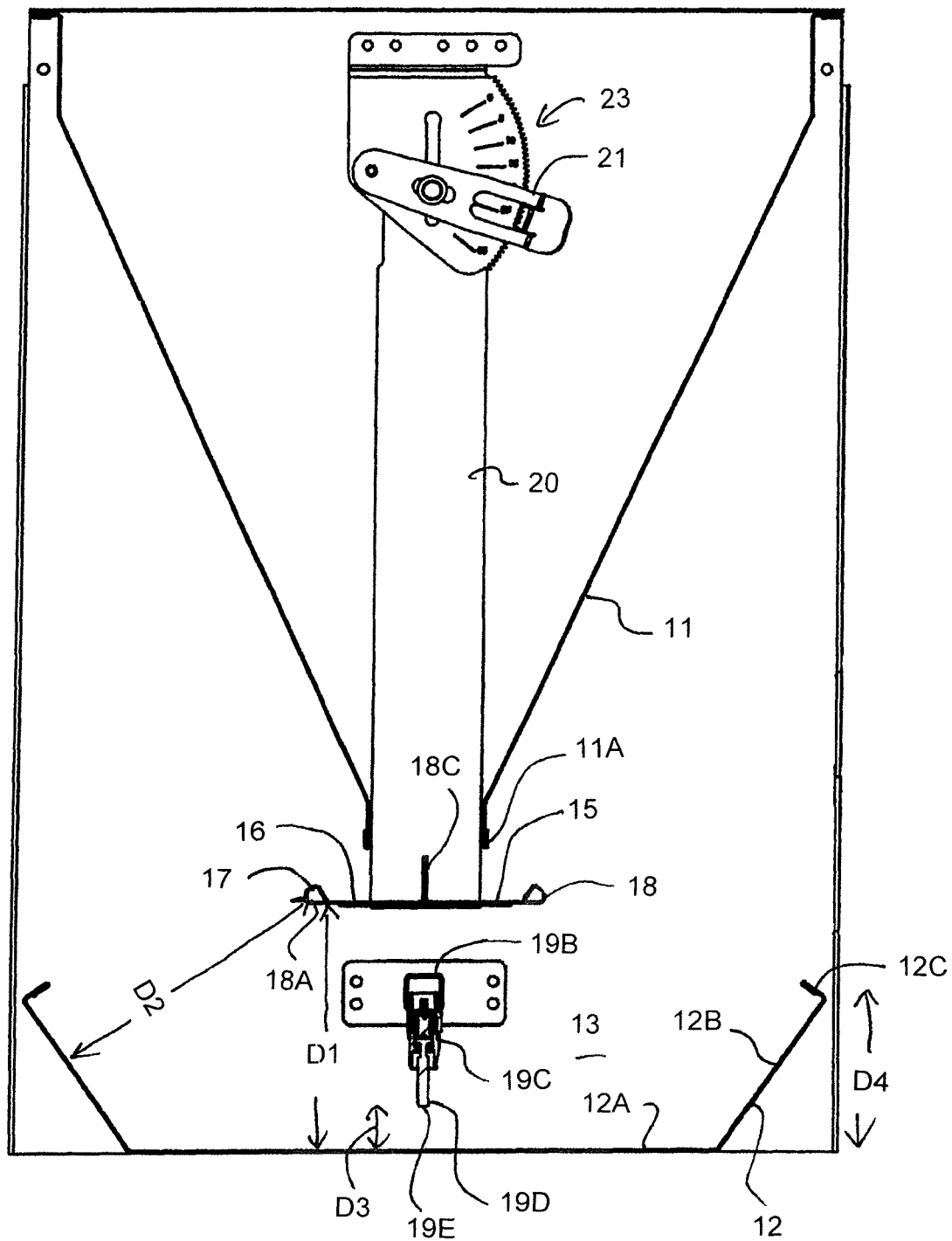
FIG. 2 is a cross sectional view through the feeder according to the present invention of FIG. 1 showing the design and arrangement of the shelf which allows the use of the feeder for pigs ranging from weanlings at roughly 20 pounds to finisher pigs which can weigh 200 to 300 pounds.

As shown in FIG. 2, the underneath of the shelf provides a totally flat surface with no downwardly projecting components. Thus the bottom of the shelf can be easily cleaned was it has no protuberances which can interfere with the flow of a cleaning fluid. The curled edges 18 can be curled as shown so that they are wholly above the horizontal surface or then can have slight downward component centered around an axis aligned with the horizontal portion (not shown). The curled cylindrical edges and the stiffening flange provide sufficient stiffness to prevent the shelf from sagging when supported only at the two ends.

The shelf has a distance D1 from the horizontal surface to the base of less than 8.0 inches and preferable less than 7.0 inches and in the example shown specifically 6.7 inches.

The shelf can also be stiffened along the length of the shelf by a stiffening member which can be v-shaped or a channel member with two legs along an underside of the shelf at a position spaced from the front edge 17. As the stiffening member is located at the center, it does not interfere with the access by the animal to the nipples since it is above the pipe 19B.

In order to allow the finisher pig to reach the nipple lever 19D the bottom end 19E of the nipple is located a distance D3 from the base of less than 2.0 inches and preferably less than 1.5 inches and typically of the order of 1.0 inch and specifically 1.2 inches.

The front edge of the shelf 17 has a closest distance D2 from a top edge 12C of the side wall which is less than 7.0 inches. The side wall 12 of the trough has a height D4 which is no greater than 5 inches in height.

As shown, the trough and the shelf are both a double sided such that the pigs can access both from each side with the shelf located midway across the trough. However single sided feeders with the same dimensions and characteristics can manufactured for example for mounting in feed lines.

Figure 4:
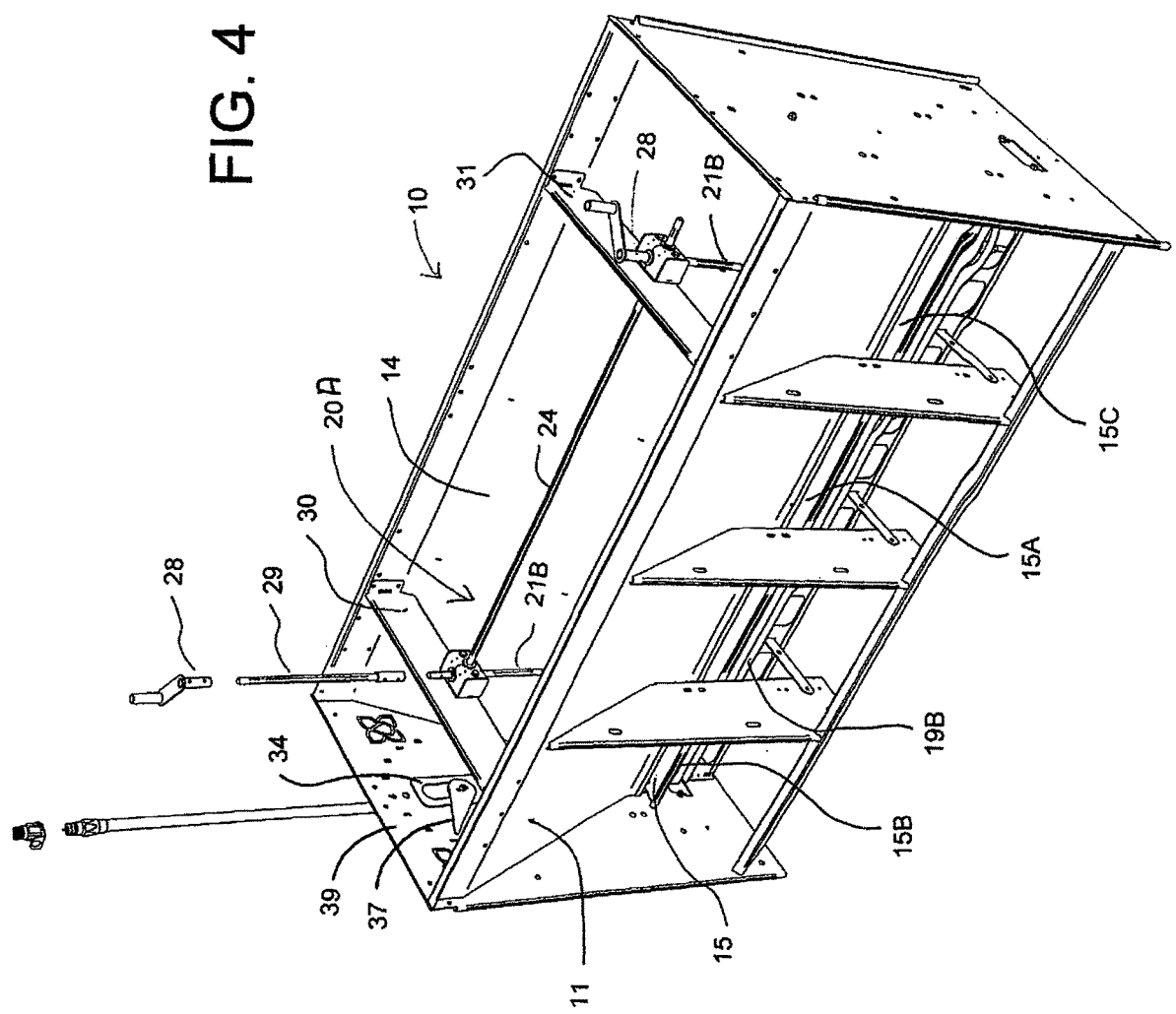
FIG. 4 is an isometric view of the feeder of FIG. 1 showing a modified adjustment system according to the present invention.
Figure 5:
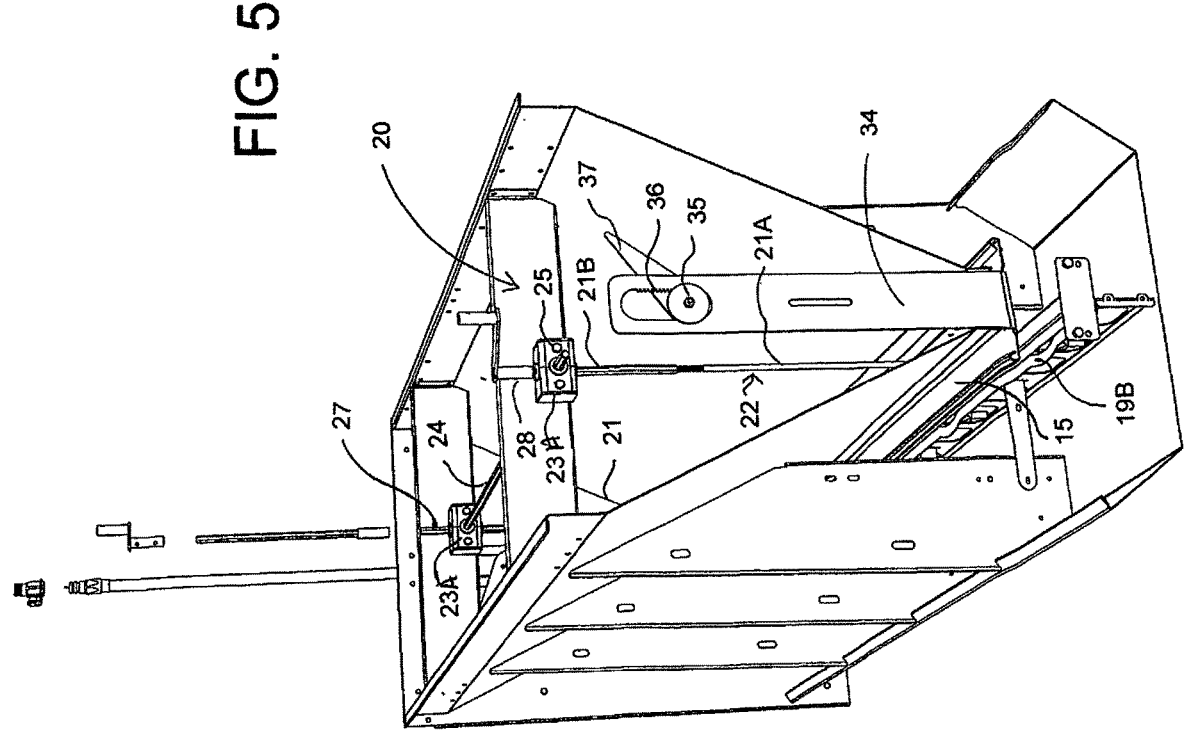
FIG. 5 is a second isometric view partly broken away of the feeder of FIG. 4 showing the modified adjustment system according to the present invention.

As shown in FIGS. 4 and 5 there is shown a modified adjustment system for the feeder described above. Thus the feeder for pigs includes the hopper 11 for containing the feed material with inclined side walls and vertical end walls 11 extending to an open top. The trough 12 acts as a receptacle for the feed. The shelf 15 defines an elongate opening between the shelf and the edge 11A through which the feed passes so that the amount of feed discharged from the hopper to the receptacle is controlled by a width of the opening.

The shelf thus forms an elongate adjustment component extending along a length of the opening. The shelf carries the weight of the feed in the hopper so that the feed applies a load to the adjustment component during adjustment, particularly when pulled upward to reduce the width of the opening.

In this embodiment an adjustment linkage 20A is provided for operating adjustment movement of the shelf. The linkage includes a first lift member 21 and a second longitudinally spaced lift member 22. Each acts to apply a lifting force to the shelf and can be lowered to lower the shelf to increase the width of the opening.

As shown best in FIG. 5, the first and second lift members 21 and 22 are spaced inwardly from a respective end wall 13 and thus from an end of the elongate shelf 15 so that there is a portion 15A of the shelf between the members and a cantilevered portion 15B, 15C beyond the end of the each member extending to the end wall 13.

Each of the lift members comprises a threaded rod portion 21A communicating with a threaded sleeve 21B so that rotation of one relative to the other drives the shelf up or down with high mechanical advantage relative to the force applied.

Each of the lift members includes a gear box 23A with a shaft 24 parallel to the shelf and extending along the hopper connected between the two gear boxes to communicate drive therebetween for simultaneous operation of the lift members.

Each of the gear boxes includes a series of bevel gears in a housing 25 arranged such that a gear attached to the sleeve 21B rotates the sleeve, which acts as a vertically extending screw member, around a vertical axis to apply the lifting force upward on the shelf 15 or to lower the shelf depending on the direction of rotation.

The housing includes a second bevel gear attached to s stub shaft 27 which drives the gear on the screw through two side bevel gears. A hand crank 28 is provided for operating one of the gear boxes by driving the input stub shaft 27. And extension piece 29 is provided to allow the hand crank to be operated as shown on the left in FIG. 4 from an elevated positon if required. Thus the system can be operated though the hand crank by selecting one of the stub shafts to provide an input into the adjustment system.

Each of the gear boxes is carried on a respective one of a pair of support beams 30, 31 each extending across the hopper at a position spaced from ends 13 of the hopper so that the lift members apply forces from the load on the shelf to the beams and thus into the hopper structure.

Thus the lift members are located within the hopper with a hand operated actuator located at a top of the feed in the hopper. This locates the adjustment system at a position spaced inwardly from the ends 13 and thus within the exterior shape of the hopper The adjustment linkage further includes a strap or other elongate member 34 lying flat against and extending along the end wall 13. The strap includes a marked gauge member 35 which indicates a position of the elongate adjustment component. Thus upward and downward movement of the strap caused by the adjustment of the shelf rotates a gear wheel 35 on a rack 36 of the strap and the wheel carries an marking lever 37 which rotates around the axis of the gear wheel to provide an indication relative to a scale 39 of the adjusted height of the shelf.

The invention claimed is:

1. A feeder for pigs comprising:
a hopper for containing a feed material to be dispensed to the pigs for feeding therefrom;
a trough for receiving the feed from the hopper from which the pigs can take the feed, the trough having end walls and side walls;
an elongate shelf mounted above the trough and extending along the trough between the end walls;
the shelf defining with a bottom edge of the hopper an opening through which the feed passes so that the amount of feed discharged from the hopper is controlled by a width of the opening, the shelf extending along a length of the opening;
the shelf being located in contact with feed in the hopper so that the feed applies a load to the shelf during adjustment movement;
and an adjustment linkage for operating said adjustment movement of the shelf, the linkage including a first lift member and a second lift member each for applying a lifting force to the shelf;
wherein each of the first and second lift member is spaced inwardly from a respective end of the shelf and from respective end walls of the trough so that there is a portion of the shelf which is cantilevered beyond a respective one of the first and second lift members;
a first and a second support beam each extending across the hopper at a position spaced from the end walls of the hopper to which a respective one of the first and second lift members is attached and onto which forces therefrom are applied;
wherein there is provided a hand operated crank for actuating one of the first and second lift member;
wherein each of the lift members includes a screw by which a rotary motion from the hand crank applies a lifting force thereto;
wherein each of the first and second lift members includes a gear box with a shaft connected between the two gear boxes to communicate drive therebetween for simultaneous operation of the first and second lift members;
wherein each of the first and second lift members comprises an elongate member extending downwardly from the respective one of the first and second beams to the shelf;
and wherein the adjustment linkage includes an upstanding elongate body separate from the elongate members of the first and second lift members;
the upstanding elongate body being lifted by movement of the shelf caused by said first and second lift members;
the upstanding elongate body located at and extending along one end wall of the hopper,
the upstanding elongate body cooperating with a marked gauge member at said one end wall which indicates a height of the upstanding elongate body and hence a height of the shelf.

* * * * *